(12) United States Patent
Sakaguchi

(10) Patent No.: US 8,184,192 B2
(45) Date of Patent: May 22, 2012

(54) IMAGING APPARATUS THAT PERFORMS AN OBJECT REGION DETECTION PROCESSING AND METHOD FOR CONTROLLING THE IMAGING APPARATUS

(75) Inventor: Takeshi Sakaguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 404 days.

(21) Appl. No.: 12/407,254

(22) Filed: Mar. 19, 2009

(65) Prior Publication Data

US 2009/0244354 A1    Oct. 1, 2009

(30) Foreign Application Priority Data

Mar. 28, 2008    (JP) ................................. 2008-088754

(51) Int. Cl.
*H04N 5/222*    (2006.01)
*H04N 5/232*    (2006.01)
*G03B 13/00*    (2006.01)

(52) U.S. Cl. .................................. 348/333.05; 348/349

(58) Field of Classification Search .......................... None
See application file for complete search history.

(56) References Cited

U.S. PATENT DOCUMENTS

| | | | | |
|---|---|---|---|---|
| 7,106,376 B1 * | 9/2006 | Anderson | ..................... | 348/345 |
| 7,433,518 B2 * | 10/2008 | Shiratani | ..................... | 382/190 |
| 7,835,550 B2 * | 11/2010 | Tamaru | ......................... | 382/118 |
| 7,889,891 B2 * | 2/2011 | Tsukiji et al. | ................. | 382/118 |
| 2008/0031611 A1 * | 2/2008 | Konishi | ....................... | 396/102 |

FOREIGN PATENT DOCUMENTS

| | | |
|---|---|---|
| JP | 03-107932 A | 5/1991 |
| JP | 8-63597 A | 3/1996 |
| JP | 2004-320287 A | 11/2004 |
| JP | 2005-086682 A | 3/2005 |
| JP | 2005-102175 A | 4/2005 |
| JP | 2006-345254 A | 12/2006 |
| JP | 2008-098739 A | 4/2008 |

* cited by examiner

*Primary Examiner* — Justin P Misleh
(74) *Attorney, Agent, or Firm* — Canon U.S.A., Inc. IP Division

(57) ABSTRACT

An imaging apparatus includes an image generation unit configured to photoelectrically convert an object image formed by an imaging optical system to generate an image, a control unit configured to perform focusing control of the imaging optical system, an object detecting unit configured to detect a plurality of object regions based on the image generated by the image generation unit, and a display unit configured to display the plurality of object regions detected by the object detecting unit. The object detecting unit sequentially detects the object regions at a plurality of positions to which the imaging optical system is moved, and the display unit juxtaposes and displays the object regions detected by the object detecting unit with respect to the image.

2 Claims, 9 Drawing Sheets and object luminance values of the faces. In the method discussed in Japanese Patent Application Laid-Open No. 2006-345254, by setting optimum shooting parameters for each group, it is possible to perform shooting with the optimum shooting parameters for each object.

IMAGING APPARATUS THAT PERFORMS AN OBJECT REGION DETECTION PROCESSING AND METHOD FOR CONTROLLING THE IMAGING APPARATUS

BACKGROUND OF THE INVENTION

1. Field of the Invention

The present invention relates to an imaging apparatus and a method for controlling the imaging apparatus. More particularly, the present invention relates to an imaging apparatus that detects a face of an object using an image signal output from an image sensor when a person is shot as the object, and also relates to a method of controlling the imaging apparatus.

2. Description of the Related Art

Conventionally, an autofocus (AF) camera of the phase-difference detection type having a plurality of focus detection points performs focal position detection at each of the plurality of focus detection points in a field. Then, the AF camera performs control to focus on a focus detection point that is automatically or intentionally selected from among the focus detection points. In the automatic focus detection point selection, a general camera selects and focuses on a focus detection point having the shortest distance to an object based on the focus detection results at the focus detection points.

Furthermore, there are AF cameras of the contrast type, which captures an object image formed by an imaging lens using an image sensor and determines an in-focus position using an image signal obtained from a focus area. The camera of the contrast type performs focusing on a focal position having a peak focus evaluation value in the focus area.

In AF cameras of the contrast type, a camera that detects a region of a face of a person and focuses on the face is known. Regarding the face detection method, Japanese Patent Application Laid-Open No. 8-63597 discusses a method for determining a face candidate region corresponding to the shape of a face of a person and determining a face region based on feature information of the face candidate region. Further, Japanese Patent Application Laid-Open No. 8-63597 discusses a method for detecting a face candidate region by extracting an outline of a face of a person from an image and a method for calculating a correlation value between a plurality of templates of various shapes of faces and detecting a face candidate region based on the correlation value.

However, in the above-described AF focus detection methods, it is difficult to perform focusing under a condition where the depth of field becomes shallow with a camera to which a lens having a long focal length is mounted. For example, when a plurality of persons exist at different distances, a main object, on which a photographer intends to focus, does not always exist within the depth of field. In such a case, it is difficult to focus on the main object.

In a camera of the phase-difference detection type, when control is automatically performed to focus on a focus detection point from among a plurality of focus detection points, if an unexpected object exists near the focus detection point, the unexpected object may be focused. Accordingly, in the camera of the phase-difference detection type, it is difficult to focus on a main object a photographer intends to shoot.

Moreover, in the camera of the contrast type, focusing is performed such that an object having a maximum peak contrast is to be focused. Accordingly, for example, when a peak of the contrast of a background is larger than that of a main object, the background may be focused. Further, for example, when a peak of the contrast of clothes is larger than that of the face of the object, the clothes may be focused. As described above, in a camera of the contrast type, the position of focus to be detected is unstable, and it is difficult to focus on a point a photographer intends to focus.

In a camera of the face detection type that detects a face of an object and focus on the face, it is possible to detect a face of an object existing within the depth of field. However, if a main object does not exist within the depth of field, it is difficult to find the main object.

To solve the drawbacks described above, Japanese Patent Application Laid-Open No. 2006-345254 discusses a method for detecting faces of a plurality of objects and grouping the faces based on shooting parameters, such as object distances and object luminance values of the faces. In the method discussed in Japanese Patent Application Laid-Open No. 2006-345254, by setting optimum shooting parameters for each group, it is possible to perform shooting with the optimum shooting parameters for each object.

However, under a condition where the depth of field of a camera is shallow, if a plurality of persons exist at different distances, it is difficult to focus on a main object a photographer intends to focus.

When a main object does not exist within the depth of field at the current focal position, it is necessary to focus on the main object within the depth of field at another focal position by driving a focusing lens. In such a case, if a camera of the phase-difference detection type is used, a closest object is focused. If a camera of the contrast type is used, a point having the highest peak of contrast is focused. However, in both cases, the focused points are not always a main object.

There is a method for detecting faces of a plurality of objects, grouping the faces based on shooting parameters, such as object distances and object luminance values of the faces, setting shooting parameters optimum for each group, and performing shooting. In the method, with a single release operation, shooting is performed at a plurality of focal points where the faces of the objects are detected. Accordingly, it is possible to perform shooting on a plurality of persons within an image plane.

In the method described above, an image of the well focused main object can be recorded. However, it is necessary to record the other images. Accordingly, unnecessary images are recorded, and it takes a lot of time to organize the shot images. Further, in this method, when a plurality of persons exist within an image plane, it is not possible to record an image with only a main object focused.

SUMMARY OF THE INVENTION

The present invention is directed to an imaging apparatus that detects, for example, faces of objects, and focuses on the objects, and displays the objects of which detection of object regions are established as a list. Further, the present invention is directed to an imaging apparatus that can select an object to focus on as a main object and focus on the selected object.

According to an aspect of the present invention, an imaging apparatus includes an image generation unit configured to photoelectrically convert an object image formed by an imaging optical system to generate an image, a control unit configured to perform focusing control of the imaging optical system, an object detecting unit configured to detect a plurality of object regions based on the image generated by the image generation unit, and a display unit configured to display the plurality of object regions detected by the object detecting unit. The object detecting unit sequentially detects the object regions at a plurality of positions to which the imaging optical system is moved, and the display unit juxtaposes and displays the object regions detected by the object detecting unit with respect to the image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
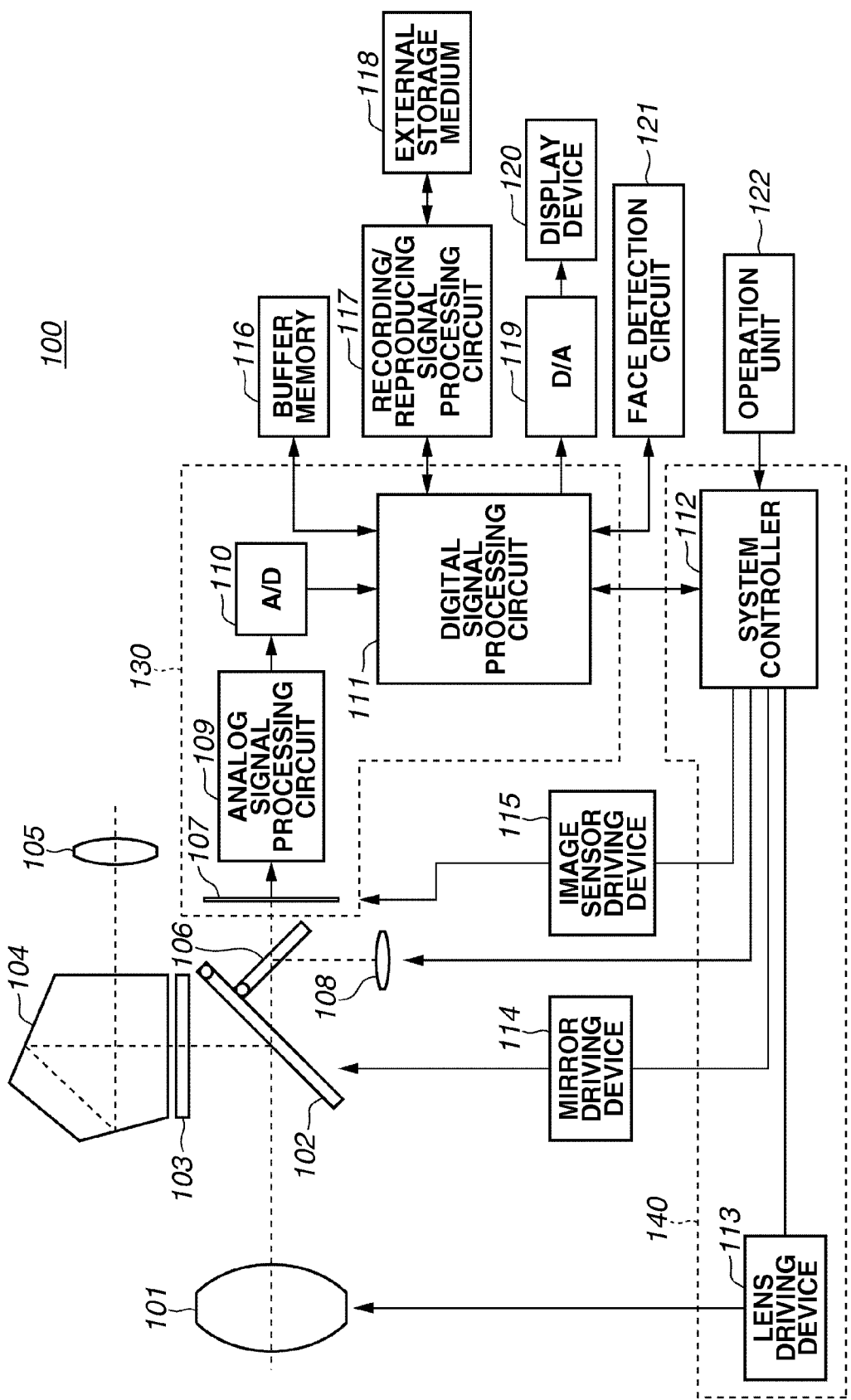
FIG. 1 is a block diagram illustrating a camera according to an exemplary embodiment of the present invention.

FIG. 1 is a block diagram illustrating a camera (imaging apparatus) 100 according to an exemplary embodiment of the present invention.

Referring to FIG. 1, the camera 100 includes an imaging optical system (imaging lens) 101 and an image sensor 107 having a plurality of pixels. The image sensor 107 includes a charge-coupled device (CCD), a complementary metal-oxide semiconductor (CMOS) sensor, or the like, on which an optical image of an object is formed by the imaging optical system 101. The image sensor 107 photoelectrically converts the object image formed by the imaging optical system 101 and outputs an image signal.

A main mirror 102, which has a semi-transmissive section, moves to the outside of an imaging light flux during shooting, and is obliquely disposed in the imaging light flux (on an optical path) during focus detection. FIG. 1 illustrates a state (mirror down) in which the main mirror 102 is inserted into the imaging light flux. In a state in which the main mirror 102 is obliquely disposed in the imaging light flux, the main mirror 102 guides a part of light flux that is transmitted through the imaging optical system 101 to a finder optical system, which includes a focusing screen 103, a pentagonal prism 104, and an eyepiece lens 105.

A sub mirror 106 can be folded or extended relative to the main mirror 102 in synchronization with operation of the main mirror 102. A part of the light flux transmitted through the semi-transmissive sectin of the main mirror 102 is reflected downward by the sub mirror 106 and enters a focus detection device 108 of the phase-difference type. Thus, a focusing state of the imaging optical system 101 can be detected.

In cameras of the contrast type, the main mirror 102 is always moved to the outside of the imaging light flux. In synchronization with the operation, in a state in which the sub mirror 106 is folded relative to the main mirror 102 (mirror up), an object optical image transmitted through the imaging optical system 101 is formed on the image sensor 107. Thus, a focusing state of the imaging optical system 101 can be detected.

An analog signal processing circuit 109 performs processing, such as denoising processing, on an image signal output from the image sensor 107 based on the light quantity of an object optical image formed by the imaging optical system 101. An analog-to-digital (A/D) converter 110 converts the analog signal output from the analog signal processing circuit 109 into a digital signal.

A digital signal processing circuit 111, which is connected to a system controller 112 (described below), performs image processing, such as shading correction or gamma correction, on the digital signal output from the A/D converter 110.

The above-described image sensor 107, the analog signal processing circuit 109, the A/D converter 110, and the digital signal processing circuit 111 constitute an image generation unit 130. The image generation unit 130 photoelectrically converts an object image formed by the imaging optical system 101 to generate an image.

The system controller 112 includes a central processing unit (CPU) for performing overall control of the camera 100, and a storage device (storage unit), such as a random access memory (RAM). The system controller 112 appropriately controls operation of various parts, such as a lens driving device 113 (described below). The storage device in the system controller 112, as will be described below, stores focal positions and image locations of a plurality of object regions detected by a an object detection unit, such as a face detection circuit 121.

The lens driving device (lens driving unit) 113 is connected to the system controller 112. The lens driving device 113 includes a communication circuit that communicates with the imaging optical system 101, a lens driving mechanism that drives the imaging optical system 101 to adjust focus, and a driving circuit that drives the driving mechanism.

The system controller 112 and the lens driving device 113 constitute a control unit 140. As will be described below, the control unit 140 performs focusing control of the imaging optical system 101.

A mirror driving device 114, which is connected to the system controller 112, drives the main mirror 102 to the outside of the imaging light flux. An image sensor driving device 115, which is connected to the system controller 112, drives the image sensor 107.

A buffer memory 116, which is connected to the digital signal processing circuit 111, functions as a frame memory that can store data of a plurality of frames captured by the image sensor 107. A digital signal output from the A/D converter 110 is temporarily stored in the buffer memory 116. The digital signal processing circuit 111 reads the data stored in the buffer memory 116, and performs the above-described processing. The data processed by the digital signal processing circuit 111 is stored in the buffer memory 116.

A recording/reproducing signal processing circuit 117 is connected to the digital signal processing circuit 111. As described above, the image data on which various digital processing is performed in the digital signal processing circuit 111 is stored in the buffer memory 116. The recording/reproducing signal processing circuit 117, after the processing, records the image data stored in the buffer memory 116 on an external storage medium 118, such as a memory card.

In recording the image data on the external storage medium 118, image data compression is performed, for example, in accordance with Joint Photographic Experts Group (JPEG) format. In reading the image data from the external storage medium 118, the recording/reproducing signal processing circuit 117 performs decompression processing on the image data. The recording/reproducing signal processing circuit 117 includes an interface for performing data communication between the recording/reproducing signal processing circuit 117 and the external storage medium 118.

A display device (display unit) 120 displays an image captured by the image sensor 107. The display device 120 is also used to reproduce and display the image data recorded on the external storage medium 118. To display an image on the display device 120, the image data stored in the buffer memory 116 is read. The read image data is converted from digital image data into an analog video signal by a digital-to-analog converter (D/A converter) 119. The display device 120 displays the image using the analog video signal converted by the D/A converter 119. As will be described below, the display device 120 displays a plurality of object regions detected by the face detection circuit 121.

In displaying an image captured by the image sensor 107 on the display device 120, two types of display formats are provided. One format is a display format used when a release operation is not performed. The display format is referred to as a through-image. In the display format, an image repeatedly captured by the image sensor 107 is sequentially updated and displayed. The other format is referred to as a freeze image. In the freeze image format, after a release operation of the camera 100 is performed, an image captured by the image sensor 107 is displayed for a predetermined period of time.

The face detection circuit (object detection unit) 121 is connected to the digital signal processing circuit 111. The face detection circuit 121 detects whether a face (object region) is contained in the image data on which various digital processing is performed by the digital signal processing circuit 111. As described above, based on the image generated by the image generation unit 130, the face detection circuit 121 detects a plurality of object regions. Regarding the face detection method, for example, Japanese Patent Application Laid-Open No. 8-63597 discusses it.

An operation unit (instruction unit) 122 is connected to the system controller 112. The operation unit 122 includes operation members used to operate the camera 100. The operation members include a power supply switch for turning on or off a power source of the camera 100, a release button, and a setting button for selecting a shooting mode, such as a person shooting mode. By operating the switches or buttons, a signal corresponding to the operation is input to the system controller 112. As will be described below, the operation unit 122 is used to select one of a plurality of object regions displayed on the display device 120. Then, the system controller 112 performs focusing control on the object region selected by the operation unit 122.

A release switch SW1, which is operable by the photographer to be turned on by a first stroke operation (half press operation) of the release button, and a release switch SW2, which is operable by the photographer to be turned on by a second stroke operation (full press operation) of the release button are connected to the release button.

Next, imaging processing performed by the camera 100 according to an exemplary embodiment of the present invention is described.

Figure 2:
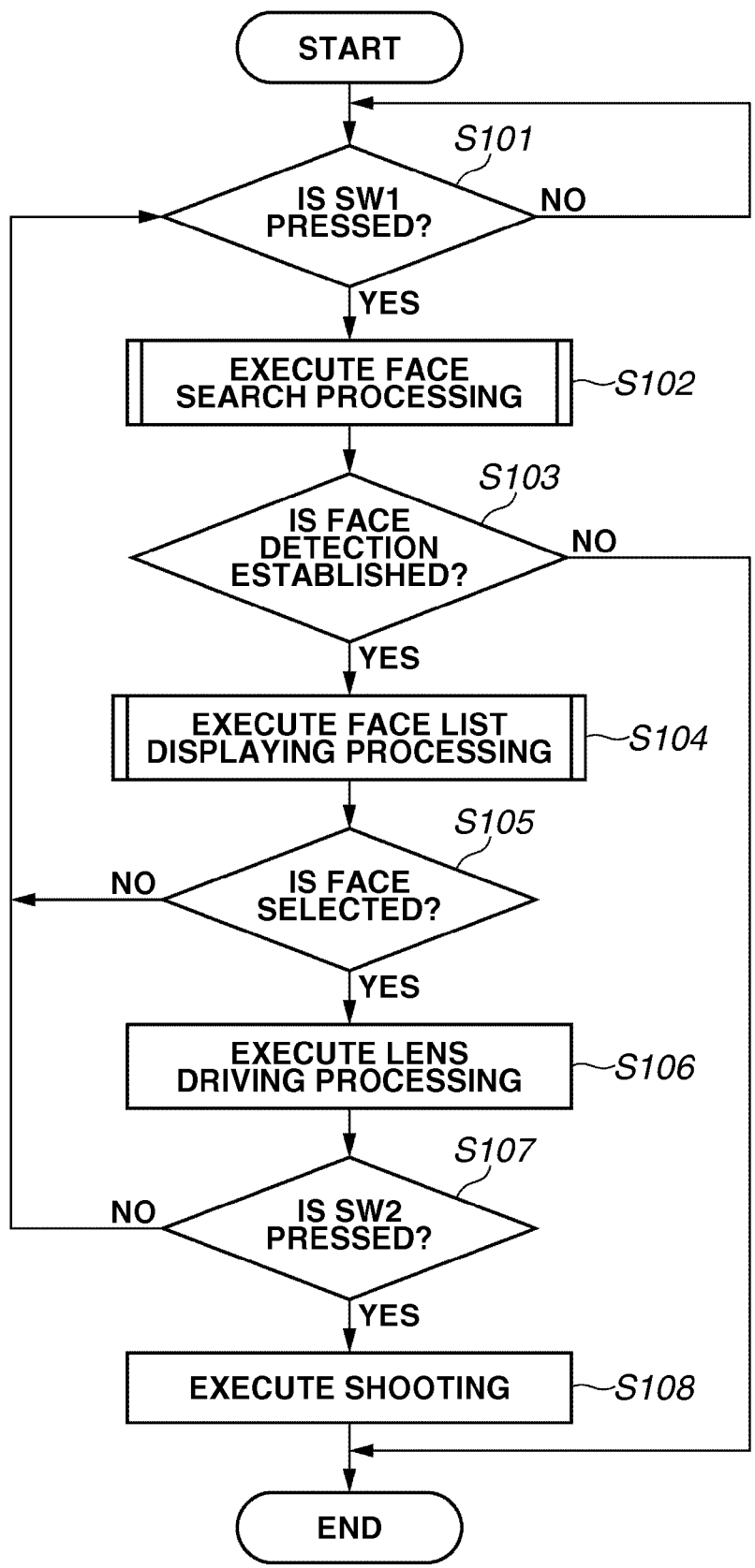
FIG. 2 is a flowchart illustrating imaging processing performed by the camera according to an exemplary embodiment of the present invention.

FIG. 2 is a flowchart illustrating imaging processing performed by the camera according to an exemplary embodiment of the present invention. In the imaging processing according to the exemplary embodiment of the present invention, shooting is performed by detecting and recognizing faces of objects and focusing on a face of a main object.

In step S101, the system controller 112 determines whether the release switch SW1, which is a part of the operation unit 122, is pressed. If the release switch SW1 is not pressed (NO in step S101), the processing in step S101 is repeated until the release switch SW1 is pressed. On the other hand, if the release switch SW1 is pressed (YES in step S101), the processing proceeds to step S102.

In step S102, the system controller 112 communicates with the imaging optical system 101 via the lens driving device 113, and drives the imaging optical system 101 within an entire drive range of the imaging optical system 101. With such control, the face detection circuit 121 can detect, in a plurality of focal positions, faces of objects in the image data on which various processing is performed by the digital signal processing circuit 111. The face search processing is described below.

Step S102 includes an image generation step for photoelectrically converting an object image formed by the imaging optical system 101 to generate an image, and a detection step for detecting a plurality of object regions based on the image generated in the image generation step.

In step S103, the system controller 112 determines whether face detection is established as a result of the face search processing in step S102. If the face detection is not established (NO in step S103), the imaging processing ends. On the other hand, if the face detection is established (YES in step S103), the processing proceeds to step S104.

In step S104, the system controller 112 generates a list of a plurality of faces of which the detection is established in step S102. The generated list of faces is displayed on the display device 120 via the digital signal processing circuit 111. As described above, step S104 includes a displaying step for displaying a plurality of object regions detected in step S102. The displaying step will be described in detail below.

In step S105, the system controller 112 determines whether a face on which the photographer intends to focus as a main object is selected from the list of faces displayed on the display device 120 in step S104 using the operation unit 122. The determination is performed by the system controller 112. If the selection of a face by the photographer is not performed (NO in step S105), the processing returns to step S101, and the above processing is repeated. On the other hand, if the intended face is selected by the photographer (YES in step S105), the processing proceeds to step S106.

In step S106, the system controller 112 drives the imaging optical system 101 via the lens driving device 113 to the focal position where the detection of the face selected in step S105 is established. As described above, step S106 includes a control step for performing focusing control on the selected object region by, in step S105, selecting one of a plurality of object regions displayed in step S104.

In step S106, the lens driving device 113 drives the imaging optical system 101 to the focal position of the object region selected using the operation unit 122. The operation is performed by the system controller 112 reading the focal position of the object region selected using the operation unit 122 from the storage device (storage unit) in the system controller 112, as described in further detail below. The lens driving device 113 (control unit 140) performs focusing control based on the focal position of the object region read from the storage device.

After the control, the face detection processing can be performed once again, or the processing can directly proceed to step S107.

In step S107, the system controller 112 determines whether the release switch SW2, which is a part of the operation unit 122, is pressed. If the release switch SW2 is not pressed (NO in step S107), the processing returns to step S101, and the above processing is repeated. On the other hand, if the release switch SW2 is pressed (YES in step S107), the processing proceeds to step S108.

In step S108, the system controller 112 performs shooting and stores the shot image.

Figure 3:
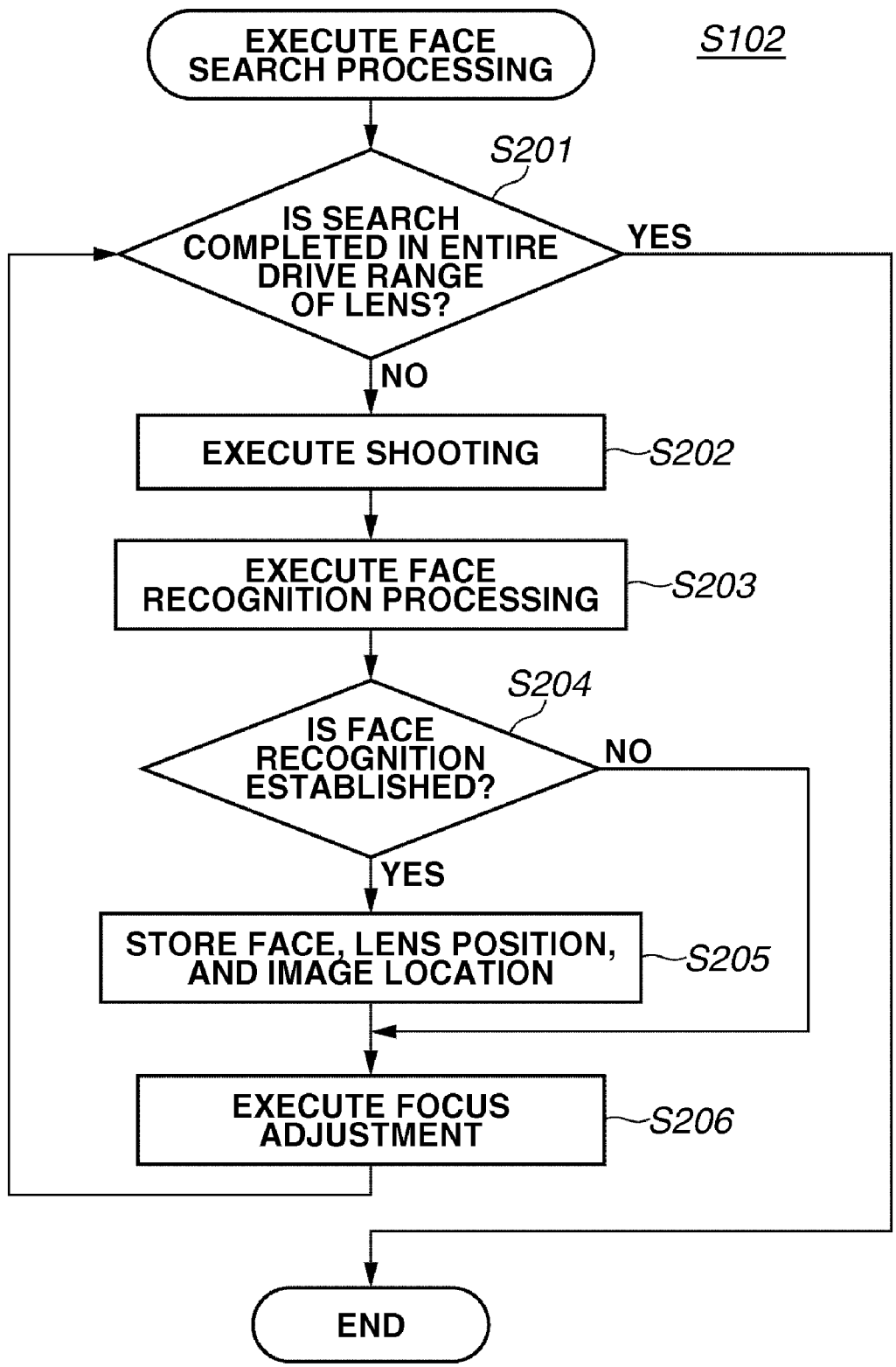
FIG. 3 is a flowchart illustrating face search processing according to an exemplary embodiment of the present invention.

Next, the face search processing performed in step S102 in FIG. 2 is described in detail. FIG. 3 is a flowchart illustrating the face search processing performed in step S102.

In step S201, the system controller 112 determines whether the face search processing is performed within the entire drive range of the mounted imaging optical system 101 via the lens driving device 113. If the face search processing is performed within the entire drive range of the imaging optical system 101 (YES in step S201), the face search processing ends. On the other hand, if the face search processing is not performed within the entire drive range of the imaging optical system 101 (NO in step S201), the processing proceeds to step S202.

In step S202, the system controller 112 writes an image signal output from the image sensor 107 as image data into the buffer memory 116 via the A/D converter 110 and the digital signal processing circuit 111.

In step S203, based on the image data written into the buffer memory 116 in step S202, the face detection circuit 121 performs the face search processing (face recognition processing).

In step S204, the system controller 112 determines whether the face recognition processing is established in step S203. If the face recognition processing is not established (NO in step S204), the processing proceeds to step S206. On the other hand, if the face recognition processing is established (YES in step S204), the processing proceeds to step S205.

In step S205, the system controller 112 stores the faces, the focal positions, and the image locations at the time of establishment of the face recognition processing in step S203 into the storage device in the system controller 112. As described above, the system controller 112 stores the focal positions and image locations of a plurality of object regions detected by the face detection circuit 121.

Instep S206, the system controller 112 performs focal position adjustment via the lens driving device 113, which drives the imaging optical system 101. After the focal position adjustment is completed, the processing returns to step S201. Then, the processing from step S201 to step S206 is repeated until the face search processing within the entire drive range of the imaging optical system 101 is completed.

Figure 4:
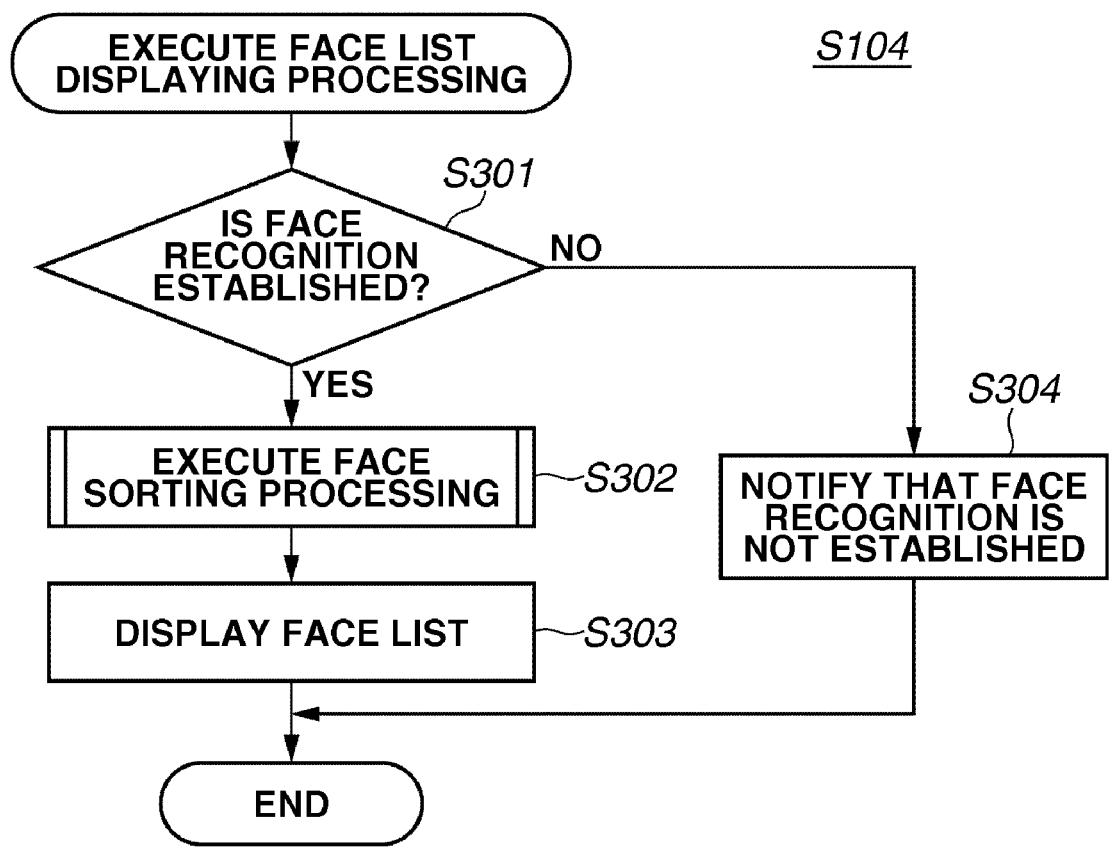
FIG. 4 is a flowchart illustrating face list displaying processing according to an exemplary embodiment of the present invention.

Next, the face list displaying processing performed in step S104 in FIG. 2 is described in detail. FIG. 4 is a flowchart illustrating the face list displaying processing performed in step S104.

In step S301, the system controller 112 determines whether the face recognition is established in the face search processing in the step S102. If the face recognition is not established (NO in step S301), the processing proceeds to step S304. In step S304, the system controller 112 notifies the photographer that the face recognition is not established. On the other hand, if the face recognition is established (YES in step S301), the processing proceeds to step S302.

In step S302, the digital signal processing circuit 111 in the image generation unit 130 sorts the faces recognized in step S301. The sorting can be performed, for example, in order of distance, or in order of image location. In performing the sorting of the faces, information about the focal positions or the image locations of a plurality of faces detected by the face detection circuit 121 is read from the storage device provided in the system controller 112 in the control unit 140. Based on the information, the digital signal processing circuit 111 performs the sorting processing.

When the sorting processing is performed according to the distance order, for example, the faces can be juxtaposed from the nearest face to the farthest face. When the sorting processing is performed according to the order of image location, for example, the faces can be juxtaposed in the direction from a central part to a peripheral part of the image plane, in the direction from the left to the right of the image plane, or in the clockwise direction. The faces can also be juxtaposed with a combination of the above-described directions. Further, the faces can be displayed without sorting the faces, for example, in order of the established face detection or at random.

Figure 5:
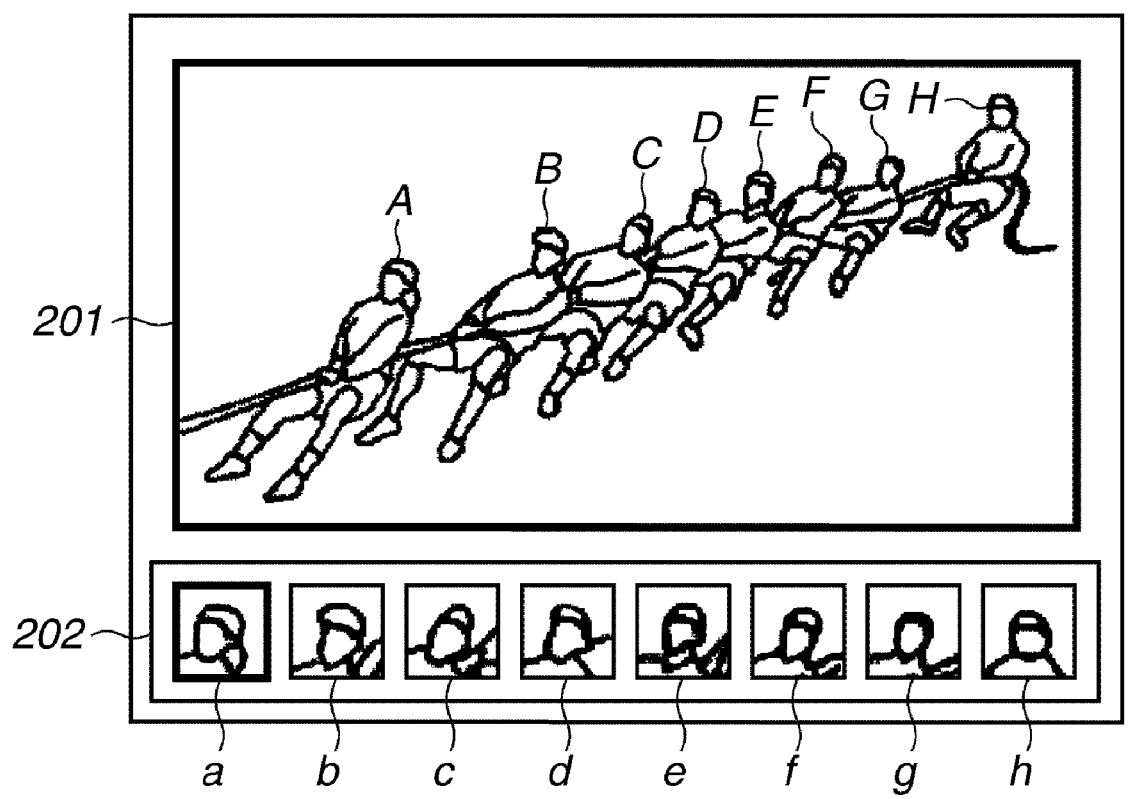
FIG. 5 illustrates a first display format of a face list in a display device according to an exemplary embodiment of the present invention.
Figure 6:
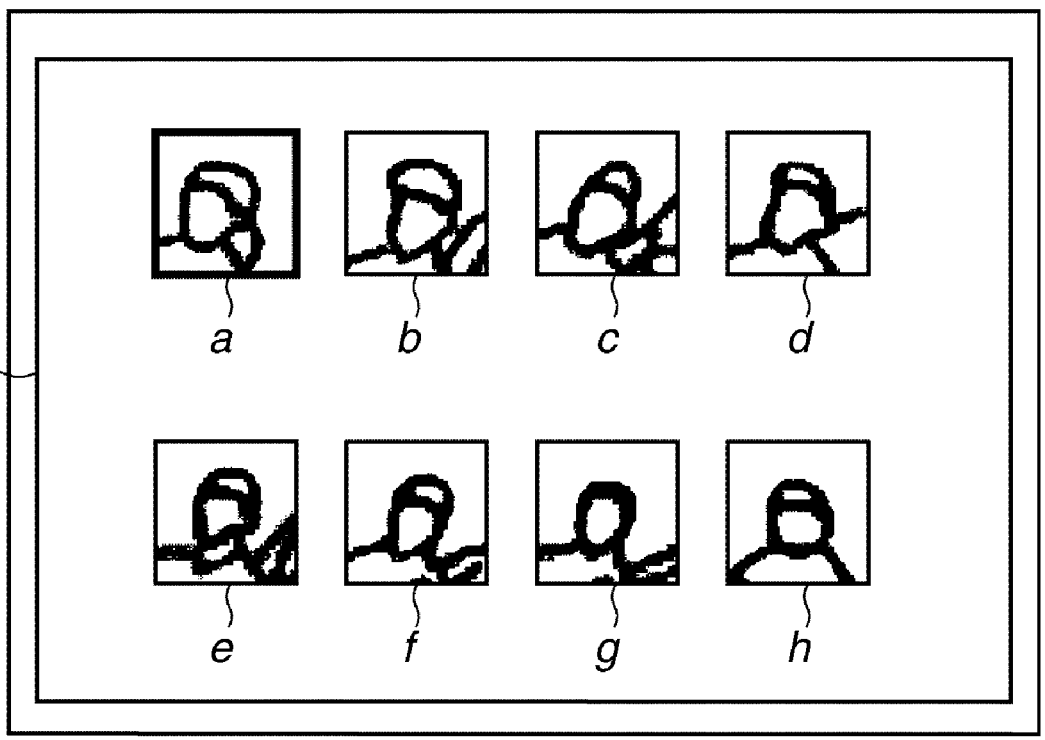
FIG. 6 illustrates a second display format of the face list in the display device according to an exemplary embodiment of the present invention.
Figure 7:
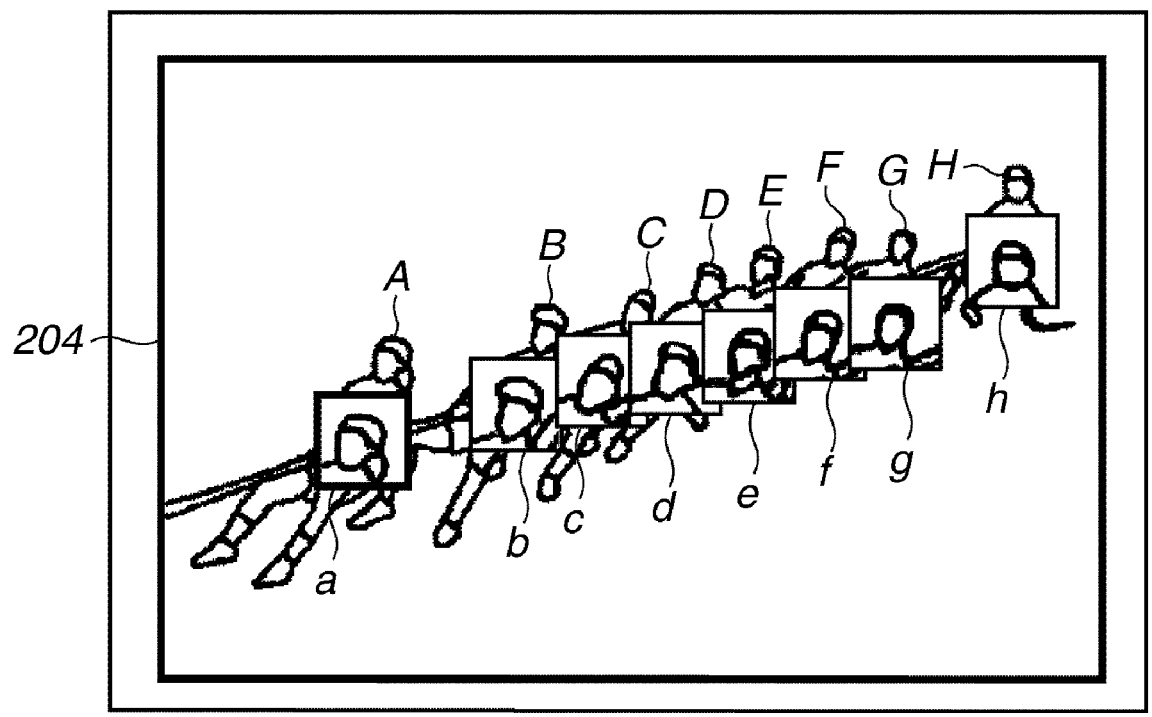
FIG. 7 illustrates a third display format of the face list in the display device according to an exemplary embodiment of the present invention.

In step S303, the system controller 112 displays the list of the faces generated in step S302 on the display device 120. More specifically, the image generation unit 130 instructs the display device 120 to display the plurality of object regions based on the information about the plurality of object regions detected by the face detection circuit 121. Examples of the display are illustrated in FIGS. 5 to 7. FIGS. 5 to 7 illustrate display formats of the face list on the display device 120 according to an exemplary embodiment of the present invention.

As illustrated in FIG. 5, as a display format of the face list, a first display format that displays an image 201 in live view and a face list 202 can be employed. In the display format, corresponding to objects A to H in the image 201 in live view, faces a to h of the objects are displayed, respectively.

In the first display format of the face list in FIG. 5, the face list 202 (faces a to h) is sorted in distance order in step S302. Then, the faces are juxtaposed from the object A that exists at a short distance to the object H that exists at a far distance, and in the order left to right. The faces displayed in the face list 202 can be displayed at the original size of the object region stored in the storage device in the system controller 112 in the face search processing, or can be displayed by enlarging or reducing to a predetermined size.

The image 201 in live view is displayed by focusing on the object A that is the nearest object in the face list 202. The image 201 in live view can be focused on the nearest object A until the photographer displays the face list 202 and selects a face to focus. Alternatively, an image that is focused in the order from the object A to the object H for every predetermined period of time can be displayed.

As a display format of the face list, as illustrated in FIG. 6, a second display format that displays only an object face list (faces a to h) 203 can be employed. Further, as illustrated in FIG. 7, a third display format that displays an image 204 by combining an image in live view with faces on which face detection is established can be employed. Also in the third display format, corresponding to the objects A to H, the faces a to h are displayed, respectively. The display formats of the face list can be changed by the photographer operating the operation unit 122.

Figure 8:
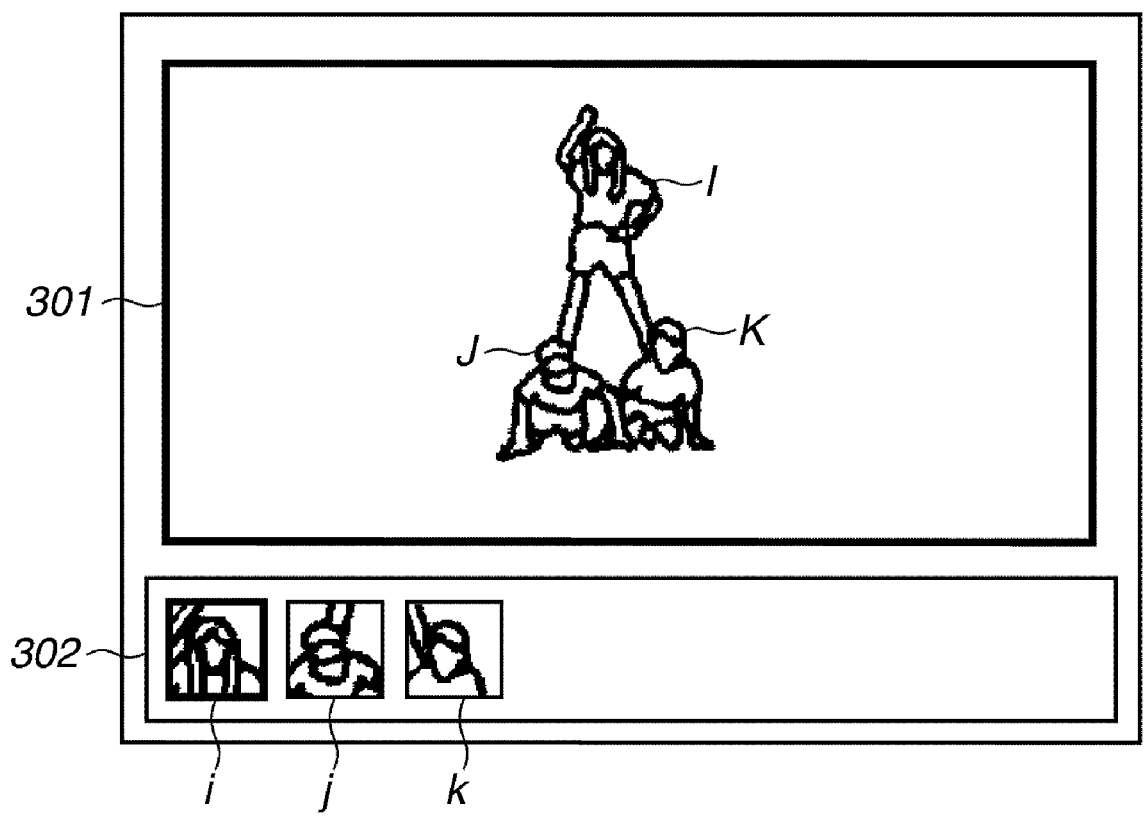
FIG. 8 illustrates a fourth display format of the face list in the display device according to an exemplary embodiment of the present invention.

FIG. 8 illustrates a fourth display format of the face list on the display device 120 according to an exemplary embodiment of the present invention. FIG. 8 illustrates a scene in which objects I, J, and K exist at the same distance from the camera. It is assumed that the objects I, J, and K exist within the depth of field at the same focal position.

In an image 301 in live view, an image of the objects I, J, and K that are in an in-focus state is displayed. In a face list 302, faces i, j, and k of the objects I, J, and K, respectively, of which face detection is established are displayed in the order of image location (counterclockwise from a central part to a peripheral part of the image plane).

Figure 9:
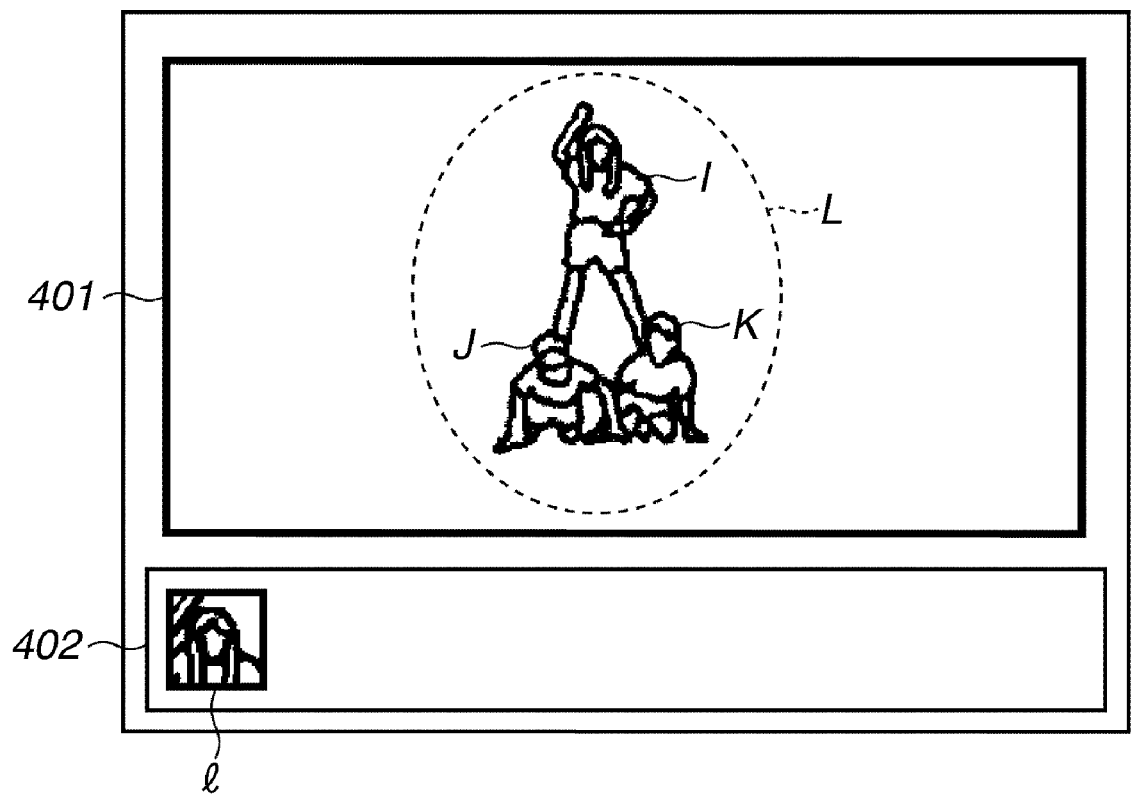
FIG. 9 illustrates a fifth display format of the face list in the display device according to an exemplary embodiment of the present invention.

FIG. 9 illustrates a fifth display format of the face list on the display device 120 according to an exemplary embodiment of the present invention. Similar to FIG. 8, FIG. 9 illustrates a scene in which objects I, J, and K exist at the same distance from the camera.

If the objects I, J, and K exist within the depth of field at the same focal position, the objects I, J, and K can be grouped as an object L such that the image is displayed as an image 401 in live view in FIG. 9. In a face list 402, a face 1 that is a representative of the group L can be displayed. In the processing, as the face 1, for example, a face at the center of the image plane is selected in the order of image location. The grouping can be performed by operating the operation unit 122 by the photographer or can be automatically performed based on the number of objects in the image plane. As described above, when the face detection circuit 121 detects a plurality of object regions within the depth of field, the system controller 112 (image generation unit 130) groups the plurality of object regions and displays the representative object region on the display device 120.

As described above, in an imaging apparatus according to an exemplary embodiment of the present invention, by selecting a face of an object a photographer intends to focus as a main object from a displayed list of faces of which the face detection is established, focusing control can be performed on the main object. Accordingly, the imaging apparatus can perform focusing control on a main object selected by a photographer.

In the above descriptions, the object the photographer intends to focus is described as a person, and the region for the focal position adjustment is described as the region of which the face detection is performed. However, an exemplary embodiment of the present invention is not limited to the above. For example, an object image can be clipped from a background to perform object detection. Then, a region corresponding to the object position can be set as an object region for focal position detection.

While the present invention has been described with reference to the exemplary embodiment, it is to be understood that the invention is not limited to the disclosed exemplary embodiment. The scope of the following claims is to be accorded the broadest interpretation so as to encompass all modifications, equivalent structures, and functions.

This application claims priority from Japanese Patent Application No. 2008-088754 filed Mar. 28, 2008, which is hereby incorporated by reference herein in its entirety.

What is claimed is:

1. An imaging apparatus comprising:
   an image generation unit configured to photoelectrically convert an object image formed by an imaging optical system to generate an image;
   a control unit configured to perform focusing control of the imaging optical system;
   an object detecting unit configured to perform an object region detection processing with a plurality of images generated by the image generation unit by moving the imaging optical system to a plurality of positions; and
   a display unit configured to display object regions detected by the object detecting unit;
   wherein, in a case where the object regions having same focal position are detected by the object detecting unit, the display unit displays a representative object region from among the object regions having the same focal position without displaying each of the object regions having the same focal position.

2. A method for controlling an imaging apparatus, the method comprising:
   photoelectrically converting an object image formed by an imaging optical system to generate an image by an image generation unit;
   performing focusing control of the imaging optical system;
   performing an object region detection processing with a plurality of images generated by the image generation unit by moving the imaging optical system to a plurality of positions;
   displaying object regions detected by the object region detection processing;
   wherein, in a case where the object regions having same focal position are detected by the object region detection processing, displaying comprises displaying a representative object region from among the object regions having the same focal position without displaying each of the object regions having the same focal position.

* * * * *